March 25, 1924.
W. C. STATE
1,488,409
METHOD OF AND APPARATUS FOR CURING INNER TUBES
Filed Aug. 16, 1920
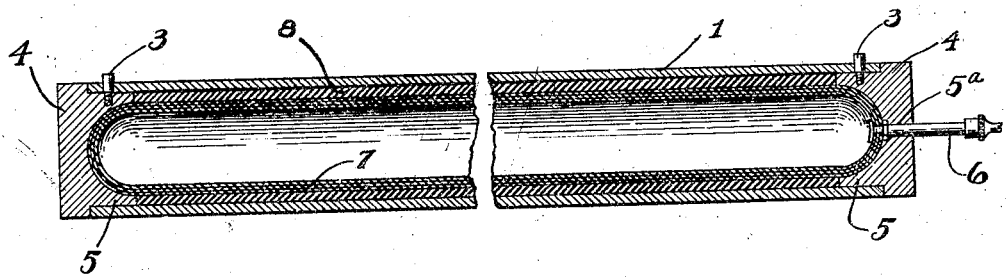
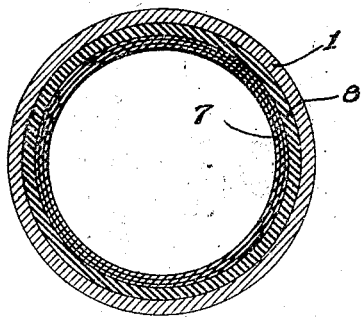
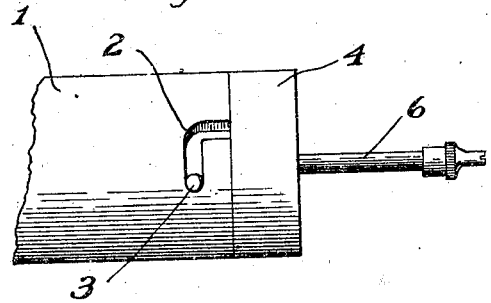
Inventor
Will C. State
By R. P. Troger
his Attorney Patented Mar. 25, 1924.

1,488,409

UNITED STATES PATENT OFFICE.

WILL C. STATE, OF AKRON, OHIO, ASSIGNOR TO THE GOODYEAR TIRE & RUBBER COMPANY, OF AKRON, OHIO, A CORPORATION OF OHIO.

METHOD OF AND APPARATUS FOR CURING INNER TUBES.

Application filed August 16, 1920. Serial No. 403,726.

*To all whom it may concern:*

Be it known that I, WILL C. STATE, a citizen of the United States, residing at Akron, in the county of Summit and State of Ohio, have invented new and useful Improvements in the Methods of and Apparatus for Curing Inner Tubes, of which the following is a specification.

My invention relates to the manufacture of inner tubes for tire casings, and it has for its primary object, the provision of a method of and apparatus for curing inner tubes which shall insure the production of a uniform product in an expeditious manner.

One of the most commonly known methods of curing inner tubes has been practiced by disposing the inner tube upon a straight mandrel, or core, after which it was wrapped by winding a strip of fabric tightly about the tube to completely cover it. The wrapped tube and its core was then disposed in a suitable heating chamber where heat was applied to cure the rubber forming the tube.

Although the above described method produces tubes which are satisfactory from a practical standpoint, it is open to criticism because the method is tedious and time consuming. The method, furthermore, is exacting because it is difficult to obtain a uniform pressure by wrapping the fabric about it after it has been disposed upon the mandrel.

One of the objects of my present invention resides in the provision of a method which shall require a minimum amount of labor in the curing of inner tubes, and which shall facilitate the proper disposal of the inner tube preparatory to curing it.

A still further object of my invention is to provide a device for curing inner tubes in which the necessary amount of pressure may be transmitted to the inner tube uniformly over its entire surface with little care being exercised on the part of the workmen.

With these and other objects in view, my invention will be more fully described, illustrated in the drawings, in which like numerals indicate like parts, and then more fully pointed out in the claims.

In the drawings, Figure 1 is a longitudinal sectional view, parts being broken away, of a device constructed in accordance with my invention.

Figure 2 is a transverse sectional view of the molding device for inner tubes provided by my invention.

Figure 3 is a side elevation of a portion of the molding device illustrating a detail of its construction.

In practicing my invention I may provide a device for curing inner tubes by employing a tubular member, preferably a metallic tubular member, which is adapted to have its ends closed by a plurality of similarly formed members which are removably secured within the ends of the tubular member.

In addition to the casing thus provided I may employ an expansible bag which is adapted to fit within the tubular member and about which the tube that it is desired to cure may be disposed.

In order to insure a clear understanding of my invention a molding device is shown in Figure 1 comprising a tubular member 1, which has been mentioned as preferably formed of a suitable metal. The tubular member is provided, adjacent its open ends, with slots 2 of L-shape, each of which is adapted to receive a pin 3 secured to an end closing member 4. As shown in the drawings, each of the end closing members 4 is circular in cross section and is adapted to fit within the ends of the tubular member 1. Each member 4 is provided with a flanged portion 5 which engages the end of the tube 1 and provides a tight joint therebetween.

It will be appreciated that the tube 1 may be closed at its ends by inserting one of the end closing members 4 in each end by disposing the pin 3 in the base of the slot 2 and turning the end member to cause the pin to engage the end wall of the slot, thus securing the end member against displacement in a longitudinal direction.

One of the end members is preferably provided with a central opening 5 adapted to receive a valve-stem 6 of an expansible bag 7. The bag is preferably of such diameter as to be adapted to fit within the tubular member 1 and allow sufficient space for the insertion of an inner tube 8, which it is desired to cure.

It will be appreciated that the dimensions of the expansible bag and its casing 1 are governed by the size of the inner tube it is desired to cure. The expansible bag is preferably of such diameter as to permit of disposing the inner tube it is desired to cure about it so that it fits snugly thereon, while the bag is in a deflated condition. The bag of course is formed of any suitable material, such as impregnated or frictioned fabric, or alternate layers of fabric and rubber.

In curing an inner tube by utilizing the above described device, the tube is properly disposed upon the deflated bag 7, which is then placed within the tubular member 1, which, of course, has at least one of its closing end members 4 removed. The end members are then disposed in place and the bag 7 is inflated by utilizing air or steam, according to the manner in which it is desired to apply the heat to cure the tube.

It will be appreciated that the expansible bag may be inflated with air to compress the inner tube between the bag and the casing 1, and the assembled device may be disposed in a suitable heating chamber where heat may be applied through the member 1. On the other hand the device may be utilized not only to obtain the desired pressure upon the inner tube, but also to transmit the desired heat for curing the tube. This may be accomplished by inflating the expansible bag with steam, which serves to apply the necessary pressure as well as the heat to the inner tube.

It will be apparent that the device above described may be operated by workmen moderately skilled in the art with little difficulty, and with a certainty of producing a uniform product. A uniform product is insured because uniform pressure is applied to the tube, and since it can only be disposed in the device in one position its proper disposition is insured before heat is applied to cure it. It will be apparent furthermore, that the number of operations necessary in finishing the tube are reduced to a minimum, which of course introduces a saving in cost by reducing the time of production.

Although I have shown and described a device for curing inner tubes, and set forth a method of employing the device in accordance with my invention, it is obvious that minor changes may be made in the construction of the device and in the manner of manipulating it without departing from the spirit or scope of my invention, and I desire therefore that no limitations shall be imposed except such as are indicated in the appended claims.

What I claim is:

1. A method of curing inner tubes that comprises disposing the tube on an expansible bag, placing the bag and the tube in a casing and inflating the bag with steam to apply pressure to the tube and heat to cure it.

2. A device for curing inner tubes comprising a tubular member having removable end closing members and an expansible air bag adapted to fit within the tubular member.

3. A device for curing inner tubes comprising a tubular member having removable end closing members, one of which is provided with a valve receiving opening, and an expansible bag having a valve adapted to fit within the tubular member with its valve extending through the end closing member.

In witness whereof, I have hereunto signed my name in the presence of two subscribing witnesses.

WILL C. STATE.

Witnesses:
J. E. KEATING,
L. M. HARTMAN.